(12) United States Patent
Warecki

(10) Patent No.: US 7,069,875 B2
(45) Date of Patent: Jul. 4, 2006

(54) PORTABLE RACEWAY

(76) Inventor: Bonnie Warecki, 7172 Isherwood Rd., Bancroft, WI (US) 54921

( * ) Notice: Subject to any disclaimer, the term of this patent is extended or adjusted under 35 U.S.C. 154(b) by 484 days.

(21) Appl. No.: 10/340,772

(22) Filed: Jan. 13, 2003

(65) Prior Publication Data

US 2004/0134443 A1   Jul. 15, 2004

(51) Int. Cl.
  *A01K 63/00*   (2006.01)
  *B65D 6/02*   (2006.01)
(52) U.S. Cl. ............................... 119/228; 119/215
(58) Field of Classification Search ............... 119/215, 119/216, 223, 224, 228
  See application file for complete search history.

(56) References Cited

U.S. PATENT DOCUMENTS

| | | | |
|---|---|---|---|
| 1,954,646 A * | 4/1934 | Pratt ........................... 220/533 |
| 2,537,219 A * | 1/1951 | Girton ........................ 220/4.16 |
| 4,044,720 A | 8/1977 | Fast ............................... 119/3 |
| 4,244,486 A * | 1/1981 | Ewald, Jr. .................... 220/646 |
| 4,457,441 A * | 7/1984 | McCloughan .............. 220/4.12 |
| 4,688,519 A | 8/1987 | Fischer ........................... 119/3 |
| 4,743,742 A * | 5/1988 | Espedalen ................... 235/1 R |
| 4,915,059 A | 4/1990 | Long ............................. 119/3 |

\* cited by examiner

*Primary Examiner*—Teri Pham Luu
*Assistant Examiner*—Kimberly S. Smith
(74) *Attorney, Agent, or Firm*—Russell L. Johnson; Patent Agent

(57) ABSTRACT

A large low cost vessel for holding flowable materials is disclosed. The vessel has a body formed of elongate rollable sheets of buoyant material that when assembled into an upwardly concave vessel having bulkheads at its ends, the vessel is self-supporting in both water and land and does not require additional forms or supports to maintain its shape.

3 Claims, 3 Drawing Sheets

PORTABLE RACEWAY

BACKGROUND OF THE INVENTION

1. Field of the Invention

This invention relates to large elongate liquid holding vessels in which liquids and activities in and on the liquids can be contained and controlled.

More specifically, this invention relates to liquid holding vessels of the type described above wherein the vessels are formed of materials that can readily be assembled to form an elongate raceway.

Still more specifically, this invention relates to vessels as described above wherein the elongate portion of the raceway may be rolled for transport and laid flat for cleaning and repair.

Still more specifically, this invention relates to vessels as described above wherein the vessels will maintain their shape without additional supports when filled with flowable material and supported by liquids or by solids or by granular material.

2. Description of the Related Art

The art of constructing large elongate vessels for holding flowable materials has become of interest for diverse applications. Elongate raceways constructed for the purpose of controlling the flowable materials and their environs as well as controlling activities in and on the flowable materials has become of great interest to a number of industries. Such vessels find applications in food processing such as the making of cheese and wine, the practice of swimming and rowing, testing of marine engines and craft, and in waste management.

There has long been a need for a low cost large long vessel that is transportable and which is self supporting in land and water The following disclosures will address the raceway of this invention, as it would be employed in aquaculture, but the scope of the invention should be understood to encompass applications that would be made readily apparent to one skilled in the art by the disclosures of this invention.

In aquaculture a raceway is defined as an elongate horizontal channel through which water flows from a head end to a tail end.

In aquaculture such raceways are employed to rear high densities of marine life having commercial value. Fish, shrimp, and crayfish are often raised commercially and to a lesser degree many other forms of aquatic life and plants have been successfully grown by means of aquaculture.

Aquaculture is practiced in natural and man made ponds as well as in tanks or raceways placed in ponds or established on land and even in buildings. The use of raceways enables the raising of dense populations of aquatic life and provides the capacity for a grower to control the quality of the water entering the head end of the raceway and the flow rate of the water leaving the tail end of the raceway and to have some control over the raceway's environment.

Heretofore, raceways of the type described above have exhibited a number of deficiencies that have negative effects on successful aquaculture. The extensive use of prior art raceways in profitable aquaculture is inhibited by their cost and lack of durability.

Efficient aquaculture requires the use of optimal densities of the aquatic life that is being cultured in the raceways. In such dense monocultures the immune distance for most diseases that harm the culture is not maintained. It is therefore critical to control the entry of diseases or toxins into the raceway and to be able to isolate any population that does become diseased. Further, if an infection or disease does enter a raceway, prior art raceways are difficult or impossible to remove from service and clean and sanitize and return to service.

It is an object of this invention to provide an aquaculture vessel that is portable, low in cost, and durable.

It is further an object of this invention to provide the vessel as described above that can readily be removed from service and cleaned and repaired as needed.

It is further an object of this invention to provide a vessel as described above that can be combined in an array of such vessels to serve the user's needs.

It is further an object of this invention to provide a vessel as described above wherein the vessel is equally adaptable to water or land supported applications.

Other objects will be made apparent from the following specifications, drawings and claims.

The prior art abounds in large vessels formed of open mesh materials for use in aquaculture on or in lakes streams and ponds. Such systems permit water born agents from the surrounding pond to enter the vessel. These agents can be harmful to the aquaculture or become an encumbrance to the vessel. Such open mesh vessels also limit the ability of the user to control the condition of and flow of water into and out of the vessel.

To overcome these defects in open mesh systems, the art has developed large elongate closed vessels called raceways. An aquaculture raceway can be defined as an elongate trough into which water flows at a head end and from which water exits at a tail end. Such troughs permit the control of the condition of the water entering and leaving the raceway and permit the culturing of dense populations of aquatic life.

U.S. Pat. No. 4,044,059 to Long teaches a raceway for culturing fish wherein the raceway is formed of a relatively thin flexible pool liner material stretched over a rigid frame and supported on a body of water by a floatation means or docks wherein a multiplicity of raceways may be interconnected to enable the sharing of water pumping, conditioning and cleaning means. Frames and liners such as taught by Long are expensive, and require significant maintenance. They also are limited to support on a body of water and are not readily transportable, U.S. Pat. No. 4,044,720 to Fast also teaches the use of a relatively thin pond liner and rigid u-shaped raceway frame supported on a pond by means of a dock or floatation means and which can be interconnected with similar raceways to share related equipment and operations. The u-shaped cross-section permits more uniform flow of water through the raceway and facilitates cleaning and maintenance. The raceways of Fast are relatively expensive and need continual maintenance and repair and are not readily rendered portable.

U.S. Pat. No. 4,688,519 to Fisher teaches a land based system of raceway like tanks made of concrete or wood having fiberglass or epoxy liners attached wherein the tanks have a cylindrically curved concave bottom portion which permits the use of a centrally pivoted bottom following member which serves to resuspend food and to introduce aerated water. Such land based systems are not readily adapted to water based use and are not readily rendered portable. They are also relatively expensive to construct and maintain.

BRIEF DESCRIPTION OF THE INVENTION

A vessel for holding flowable material comprising: an upwardly concave curved body formed of flexible, chemically stable material that has a density of less than 1.0 and a thickness of at least 0.1 inches and having a head end and a tail end, a head end bulkhead and a tail end bulkhead formed of the same material as the body sealably secured to the head end and tail end respectively of the body to form sealed vessel for holding flowable materials, and the vessel has a width of at least 3.0 feet and a depth of at least 1.5 feet and a length of at least 8 feet.

DETAILED DESCRIPTION OF THE INVENTION

Figure 1:
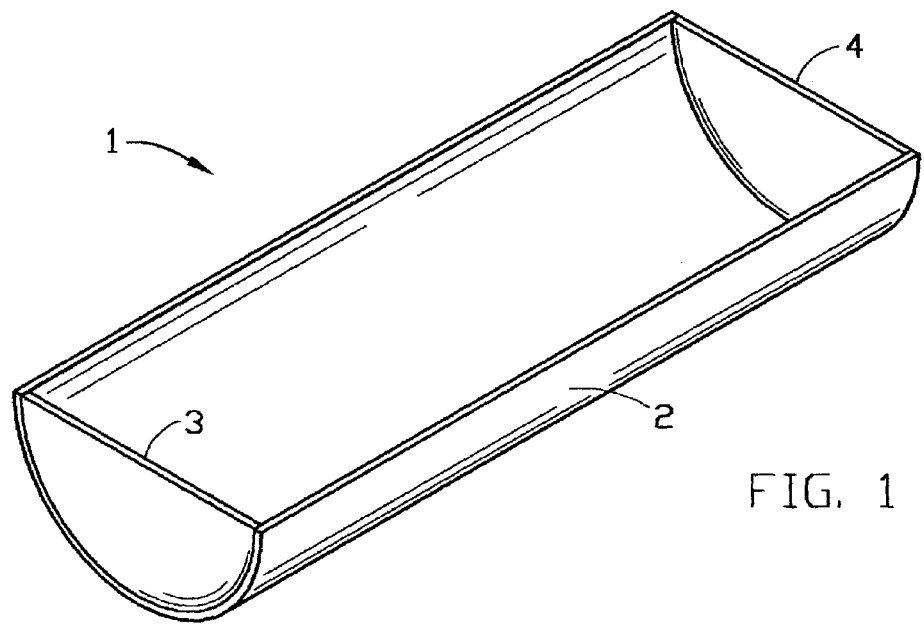
FIG. 1 is a pictorial view of the vessel of this invention in its simplest form.

In the drawings like numbers refer to like objects and the proportions of some elements have been modified to facilitate illustration.

The term self-supporting as used herein shall be read to mean capable of maintaining its shape without additional supports.

The vessel of this invention will ordinarily be releaseably secured to decking or docks or rafts or the like for the purpose of supporting workers and equipment used in the process for which the vessel is employed. The vessel of this invention can readily be releasably secured to adjacent structures and apparatus and in a like manner, equipment and apparatus used in conjunction with the vessel can readily be secured to and disconnected from the vessel of this invention so as to permit the removal and reinstallation of the vessel from its use location.

Referring now to FIG. 1 wherein vessel 1 is shown in its simplest form. Body 2 is formed of relatively thick stiff and chemically inactive plastic material having a density less than 1.0 capable of being rolled up for transport. First bulkhead 3 and second bulkhead 4 are formed of the same material as body 2, which facilitates bonding, welding and mechanical fastening of components of the raceway. Vessel 1 is self-supporting and requires no additional supporting structures when residing in water or soil.

As shown in FIG. 1 bulkheads 3 and 4 have a semicircular shape and vessel 1 is in the shape of a half of a right circular cylinder. The materials of construction of vessel 1 have a thickness for most of the preferred materials of between 0.1 and 0.2 inches and have a density of less than 1.0. Vessel 1 is buoyant and can maintain its shape in water without supports. As shown in FIG. 1 bulkheads 3 and 4 are welded to the ends of body 2 along their lines of intersection to form a unitary structure. Vessel 1 represents parent vessel from which all the variants of vessel 1 can be derived and partake of its virtues.

Body 2 and bulkheads 3 and 4 of vessel 1 are formed of the same flexible but relatively thick plastic sheet material which permits the joining of the parts of vessel 1 by means of welding, chemical bonding, and/or mechanical fastening. While it is practical to form vessel 1 of relatively expensive material such as polyvinylchioride (PVC), a preferred material for forming vessel 1 is recycled high-density polyethylene, because of its desirable properties and its relatively low cost. Plastic materials such as those contemplated for use in vessel 1 have a density less than 1.0 and therefore the material is buoyant in water and therefore vessel 1 does not sink in water and rafts and docks are not needed to support vessel 1 in water. The cylindrical shape of vessel 1 gives it sufficient flexibility to accommodate wave action on vessel 1 but sufficient stiffness to hold its shape in water. When land supported, vessel 1 requires only readily formed trenches or mounds of dirt or other granular material on which the weight of vessel 1 filled with water can be supported. In applications wherein earthen support is not desirable vessel 1 is readily adapted to use with more substantial supports.

Vessel 1 is chemically inactive and is readily cleaned and sanitized. The raising of fish in raceways such as those formed using the constructions of vessel 1 requires the removal of fish wastes and food debris which is readily achieved by the use of conventional swimming pool cleaning apparatus such as vacuum cleaning mechanisms and filters.

Figure 2:
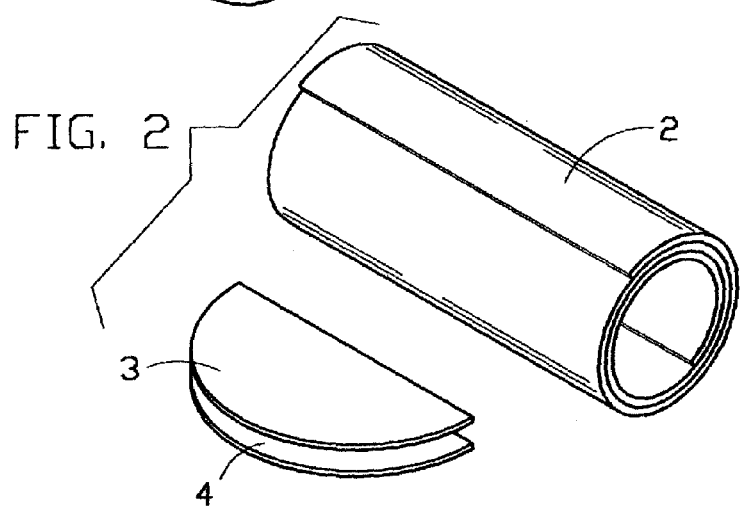
FIG. 2 is a pictorial view of the vessel of FIG. 1 in knocked down configuration.

In relatively small sizes such as that of FIG. 1, vessel 1 can be assembled off site and transported as a unit. For example a vessel 1 having a diameter of 3 feet and a depth of 1.5 feet and a length of 8 feet and formed of recycled high density polyethylene having a thickness of 0.1 inches would weigh less than 40 pounds and could be carried in a small truck or van. Alternatively body 2 and bulkheads 3 and 4 can be formed off site and be transported knocked down as shown in FIG. 2, to be assembled on site.

When vessel 1 is given more typical dimensions for aquaculture raceways it becomes less practical to transport vessel 1 assembled and the joinery for assembly and disassembly becomes a critical attribute of the vessel of this invention. For example: in a raceway constructed according to this invention, a vessel 1 having the dimensions of approximately 8 feet wide, 4 feet deep, and 40 feet long measured along the long axis of vessel 1 and formed of 0.125 inch thick recycled high density polyethylene would have an assembled weight in the order of 350 pounds and be awkward to handle and transport on the highway, but when knocked down it could readily be transported in a small truck. As shown in FIG. 2, the material of which body 2 is formed is rollable and permits vessel 1 to be transported knocked down.

Plastic sheets of the thickness to serve as body 2 are not readily formed in the widths that would be needed to form body 2 as a single sheet for larger applications. It is more practical to form body 2 of multiple sheets and join the long edges of multiple sheets of indeterminate length. Joints can be formed by welding, chemical bonding or by the use of releasable fasteners such as nuts and bolts. In practice all three methods of joinder have applications in assembling vessels 1 and their associated structures and apparatus.

Figure 3:
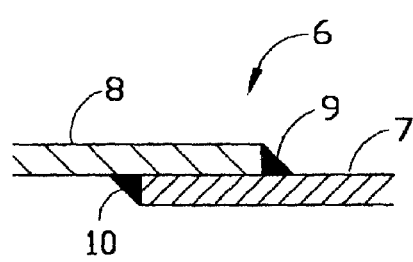
FIG. 3 is a sectioned elevation of a thermally welded lap joint used in forming the vessel of FIG. 1.

Referring now to FIG. 3 wherein a lap joint 6 is illustrated as it might be formed to join longitudinal strip 7 and longitudinal strip 8 by means of continuous welds 9 and 10. It should be understood that lap joint 6 could also be formed by adhesive or chemical bonding or by the use of mechanical fasteners and a sealing gasket. In fish rearing raceways it has been found to be beneficial to form the central strip or strips of the raceway of light colored plastic and the outside strips of a dark plastic to facilitate cleaning and fish observation while providing the fish with darker areas, which they tend to prefer.

Figure 4:
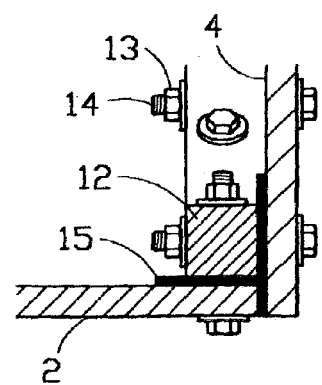
FIG. 4 is a sectioned elevation view of a corner joint employing mechanical fasteners in the forming of the vessel of FIG. 1.

Referring now to FIG. 4 wherein a corner joint using mechanical fasteners between bulkhead 4 and body 2 is illustrated. As shown, a bulkhead bow frame 12 is employed to fasten body 2 and bulkhead 4 to each other by means of nuts 13 and bolts 14. Gasket material 15 is employed to seal the joint against leakage.

Figure 5:
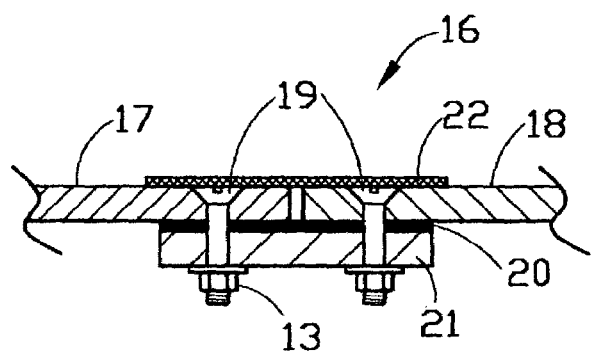
FIG. 5 is a sectioned elevation view of a butt joint employing mechanical fasteners in the forming of the vessel of FIG. 1.

Referring now to FIG. 5 wherein butt joint 16 is illustrated. The body of the vessel of this invention can be rolled up and readily transported. There are limitations on the length of body material that can be rolled up and transported and therefore, for very long bodies 2, butt joints become necessary. Butt joints can be formed by thermal welding and by chemical welding and reinforced as needed. In applications wherein the vessel is expected to be disassembled and cleaned or moved it is desirable to have a mechanically established butt joint such as butt joint 16 which will provide a smooth inner surface of the vessel. First body member 17 and second body member 18 are counter sunk to receive flat head bolts 19, which pass through gasket material 20 and reinforcing strip 21. Covering material 22 is applied to provide a smooth inner surface to body 2 and prevent contaminants from finding lodging places in the joint.

Very long raceways are desirable in aquaculture. Because the number of locations that can accommodate very long raceways is limited, it is desirable to arrange raceways in festooned or other arrayed configuration.

Figure 6:
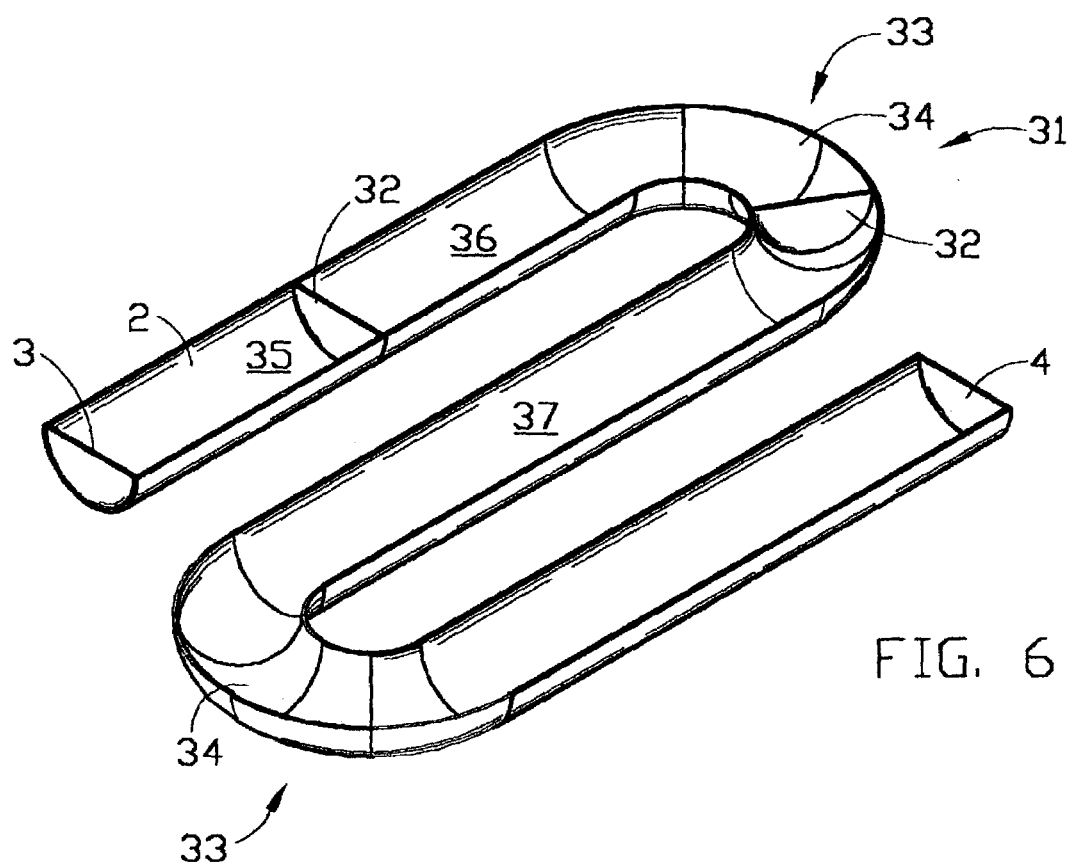
FIG. 6 is a pictorial view of the vessel of FIG. 1 wherein transition pieces are incorporated into the mid-span of vessel of FIG. 1 to change the direction of longitudinal axis of the vessel of FIG. 1.
Figure 7:
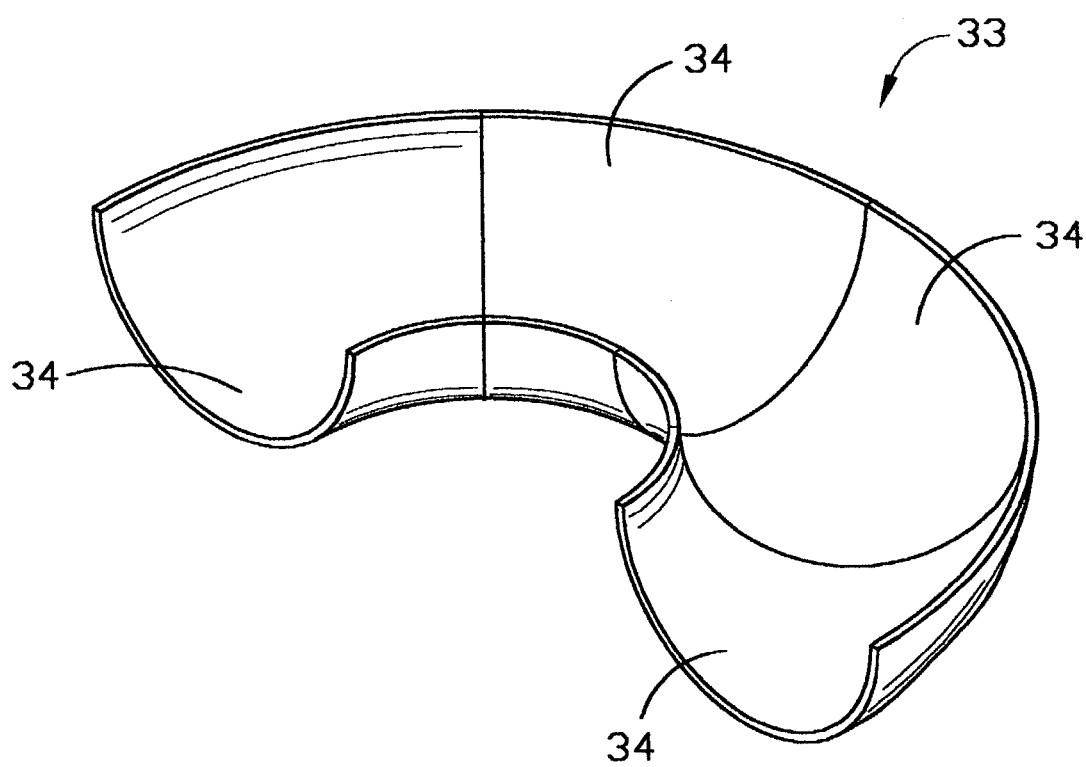
FIG. 7 is pictorial view of the transition piece of FIG. 6.

Referring now to FIGS. 6 and 7 wherein a raceway 31 is shown in a festooned configuration and to be provided with movable bulkheads 32 and transition pieces 33. Transition pieces 33 are formed of the same sheet material as body 2 and bulkheads 3 and 4 and are formed of segments 34 each of which can be given a cylindrical shape and when joined to adjacent segments 34 by methods described above will form an elbow or bend which can then be connected to body 2 to form a continuous festooned raceway. The geometries for forming Y-shaped and T shaped transitions of similar design are well known in the sheet metal art and are applicable to the constructions of this invention to provide a means for forming arrays of vessels 1 in many configurations.

One of the sources of loss of fish during the rearing of fish is the stress and physical injury caused to fish in moving them from place to place. As fish grow the volume of water required by each fish grows. Efficient aquaculture requires that fish of uniform size be grown together and that the fish be provided with larger growing volumes as the fish grow. Raceway 31 is provided with movable bulkheads 32 to permit the herding of fish along raceway 31 and the changing of the size of compartments 35, 36, and 37 as the fish grow and are moved along raceway 31.

The above specifications along with the associated drawings disclose a transportable large vessel that is self-supporting in land and water and that is formed of low cost materials and by low cost methods and that has many diverse applications. The above disclosures would enable one skilled in the art to make and use the vessel of this invention without undue experimentation. However, to disclose and illustrate all the configurations and applications the vessel of this invention lends itself to and that would be made obvious to one skilled in the art would greatly multiply the drawings and cause the specifications to become prolix. Therefore, the scope of this invention should not be limited by the disclosures above but the scope of this invention should only be limited to the scope of the appended claims and all equivalents thereto that would be made apparent thereby to one skilled in the art.

What is claimed is:

1. A vessel for holding flowable material comprising:
   a) an upwardly concave body having a long axis and the body is formed of rollable sheets of flexible, chemically stable material that has a density of less than 1.0 and a thickness of at least 0.1 inches and having a head end and a tail end,
   b) a head end bulkhead and a tail end bulkhead formed of the same material as the body sealably secured to the head end and tail end respectively of the body to form a sealed vessel for holding flowable materials, and
   c) wherein the vessel is self-supporting in water and in land, and the vessel has a width of at least 3.0 feet and a depth of at least 1.5 feet and a length of at least 8 feet, and
   d) wherein the body is formed of at least two sheets of a plastic material having long edges and the sheets are sealably joined to each other along their long edges.

2. A vessel for holding flowable material comprising:
   a) an upwardly concave body having a long axis and the body is formed of rollable sheets of flexible, chemically stable material that has a density of less than 1.0 and a thickness of at least 0.1 inches and having a head end and a tail end,
   b) a head end bulkhead and a tail end bulkhead formed of the same material as the body sealably secured to the head end and tail end respectively of the body to form a sealed vessel for holding flowable materials, and
   c) wherein the vessel is self-supporting in water and in land, and the vessel has a width of at least 3.0 feet and a depth of at least 1.5 feet and a length of at least 8 feet, and
   d) wherein the body is formed of at least two sheets of a plastic material having long edges and the sheets are sealably joined to each other along their long edges, and
   e) wherein the body is formed of at least 3 sheets of plastic material, having two outside sheets and at least one sheet between the outside sheets, and the plastic of the outside sheets is dark in color and the plastic sheets between the outside sheets are a light color.

3. A vessel for holding flowable material comprising:
   a) an upwardly concave body having a long axis and the body is formed of rollable sheets of flexible, chemically stable material that has a density of less than 1.0 and a thickness of at least 0.1 inches and having a head end and a tail end,
   b) a head end bulkhead and a tail end bulkhead formed of the same material as the body sealably secured to the head end and tail end respectively of the body to form a sealed vessel for holding flowable materials, and
   c) wherein the vessel is self-supporting in water and in land, and the vessel has a width of at least 3.0 feet and a depth of at least 1.5 feet and a length of at least 8 feet, and
   d) wherein the vessel is provided with at least one movable bulkhead by means of which the vessel may be divided into segments of lengths that can be varied by moving the bulkhead.

\* \* \* \* \*